United States Patent [19]

Komatsu et al.

[11] Patent Number: 4,669,364
[45] Date of Patent: Jun. 2, 1987

[54] RACK-AND-PINION STEERING GEAR STRUCTURE FOR A VEHICLE

[75] Inventors: Shinich Komatsu, Hatano; Seiji Uemura, Kanagawa; Koichi Komatsu, Atsugi, all of Japan

[73] Assignee: Atsugi Motor Parts Co., Ltd., Kanagawa, Japan

[21] Appl. No.: 674,967

[22] Filed: Nov. 26, 1984

[51] Int. Cl.[4] ............................................. F01B 29/00
[52] U.S. Cl. ........................................ 92/128; 92/129; 92/136; 92/255
[58] Field of Search ............... 92/136, 138, 128, 255, 92/256, 257, 258, 129

[56] References Cited

U.S. PATENT DOCUMENTS

| | | | |
|---|---|---|---|
| 2,736,625 | 2/1956 | Naab | 92/155 |
| 2,847,868 | 8/1958 | Newman | 92/138 |
| 3,118,349 | 1/1964 | Combs | 92/129 |
| 3,605,602 | 9/1971 | Tyson | 92/258 |
| 3,785,253 | 1/1974 | Sandau | 92/258 |
| 3,806,134 | 4/1974 | Schexnayder | 92/258 |
| 4,004,499 | 1/1977 | Beck | 92/258 |
| 4,261,251 | 4/1981 | Shepherd | 92/258 |
| 4,275,641 | 6/1981 | Kopp | 92/136 |
| 4,373,599 | 2/1983 | Walter et al. | 92/167 |
| 4,380,273 | 4/1983 | Walter | 92/136 |
| 4,479,400 | 10/1984 | Rieger | 92/85 R |
| 4,527,465 | 7/1985 | Yoshida et al. | 92/136 |

*Primary Examiner*—Abraham Hershkovitz
*Attorney, Agent, or Firm*—McAulay, Fields, Fisher, Goldstein & Nissen

[57] ABSTRACT

A rack-and-pinion steering gear structure for a vehicle including a rack housed within a cylinder and driven by means of a pinion shaft, comprises an annular piston received with suitable axial clearance in an annular groove defined by three surfaces, namely the end face of one end of the rack, a seating surface of a head of a bolt screwed into a boss projecting from the end of the rack, and the outer periphery of the boss itself. An elastic annular seal member is interposed between the inner periphery of the piston and the outer periphery of the boss.

12 Claims, 9 Drawing Figures

RACK-AND-PINION STEERING GEAR STRUCTURE FOR A VEHICLE

BACKGROUND OF THE INVENTION

1. Field of the Invention

The present invention relates to a steering gear structure of the rack-and-pinion type used in a vehicle.

2. Description of the Prior Art

There is a steering gear of the rack-and-pinion type in which a piston is received within a rack cylinder and reciprocates within the oil-filled rack cylinder so as to move the rack via a pinion associated with a steering wheel according to the rotation of the steering wheel by an operator. A rack-and-pinion steering gear has been proposed in which the piston is elastically attached to one end of the rack in order to partition the rack cylinder into two chambers and to ensure the oil-tightness of the piston which slides smoothly within the rack cylinder by preventing misalignment between the piston and rack.

The above-described conventional steering gear structure of the rack-and-pinion type is exemplified by Japanese Patent Application No. 55-104,929 filed on July 30, 1980 and its unexamined Open No. 56-25058 published on Mar. 10, 1981. The corresponding U.S. Pat. No. is 4,380,273 to Walter filed on Aug. 1, 1980.

The system construction disclosed in the above-identified document will be described in detail hereinafter with reference to FIGS. 1 and 2.

In FIGS. 1 and 2, numeral 1 denotes a pinion shaft rotatably disposed within a gear housing 2 and numeral 3 denotes a rack driven by the pinion shaft 1. In addition, numeral 4 denotes a boss projecting axially from the end face 3b of one end 3a of the rack 3 and having a smaller outer diameter $l_2$ than the outer diameter $l_1$ of the rack 3. Numeral 5 denotes a base ring fitted over the boss 4. Numeral 6 denotes a piston mounted on the radial periphery of the base ring 5. An annular projection 7 formed on the inner periphery 6a of the piston 6 is housed within an annular recess 8 formed in the outer periphery 5b of the base ring 5 with a desired clearance in the axial direction. An outer seal ring 11 and an elastic seal ring 12 are received in an outer seal groove 9 formed in the outer periphery 6b of the piston 6. The outer seal ring 11 serves to provide a liquid-tight seal structure between the cylinder 10 and piston 6. The elastic seal ring 12 is arranged inside of the outer seal ring 11. Numeral 13 denotes two elastic seal rings arranged side-by-side between the annular recess 8 of the base ring 5 and annular projection 7 of the piston. Finally, numeral 14 denotes a rivet-shaped bead formation retaining the base ring 5 on the rack 3.

Since in the rack-and-pinion steering gear structure of the construction described above the piston 6 is elastically installed in such a way that there is a clearance in the axial direction with respect to the end 3a of the rack 3 and the piston 6 is urged into elastic contact radially with the wall 10a of the rack cylinder 10 by the elastic seal rings 13, installation errors can be canceled by the play in the piston 6 should the piston 6, rack 3, and cylinder 10 not be accurately mounted coaxially. Consequently, the outer seal ring 11 will always elastically contact the inner periphery 10a of the cylinder 10 without clearance. Hence, the piston 6 partitions the cylinder 10 into the two operation chambers 15, 16 while providing a liquid-tight seal structure therebetween by means of the outer seal ring 11.

In addition, since the piston 6 slides along the inner periphery (wall) 10a of the cylinder 10 even in the case where a part of or all of the rack 3 is bent or skewed, the piston 6 can smoothly reciprocate within the cylinder 10 without excessive pressure locally on any part of the inner periphery 10a of the cylinder.

However, there are drawbacks in the above-described conventional steering gear structure in that since the base ring 5 must be interposed between the piston 6 and boss 4 and two elastic seal rings 13, 13 must be interposed between the base ring 5 and annular projection 7 of the piston 6, and furthermore the base ring 5 must then be mounted on the rack 3 and thereafter the tip of the boss 4 must be flared to hold it in place, it takes a long time and a great deal of skill to assemble. In addition, since in order to mount the piston 6 with adequately small axial clearances, the steering gear must include the base ring 5 within which the annular projection 7 is inserted, the profiles and structures of the constituent parts are unavoidably complex and accordingly the cost of machining the parts and so the total cost of assembling the steering gear will be unnecessarily high.

SUMMARY OF THE INVENTION

In accordance with the present invention, it is an object of the present invention to provide an improved rack-and-pinion steering gear structure with a simple construction so as to minimize assembly cost and assembly operation time.

To achieve the above-described object, the rack-and-pinion steering gear structure according to the present invention is so constructed that an annular piston is received with axial clearance in an annular groove surrounded by three surfaces, i.e., the end face of one end of the rack, the base surface of the head of a bolt screwed into a boss projection from the mentioned end face of the rack, and the outer periphery of the boss, and, furthermore, an elastic annular seal member is interposed between the inner periphery of the piston and outer periphery of the boss. Therefor, the piston can be mounted with suitable axial clearance for axially floating support thereof. Because of the piston and seal grooves are not complicated configuration, easy production is achieved.

BRIEF DESCRIPTION OF THE DRAWINGS

A more complete understanding of the present invention will be obtained from the following description taken in conjunction with the drawings in which like reference numerals designate corresponding elements and in which:

FIG. 4 is an exploded view of the four crucial elements of FIG. 3, in which:

FIG. 4(A) is a perspective view of a bolt shown in FIG. 3;

FIG. 4(B) is a perspective view of both the inner and outer annular sealing members shown in FIG. 3;

FIG. 4(C) is a perspective view of a piston shown in FIG. 3;

FIG. 4(D) is a perspective view of the end of the rack shown in FIG. 3;

DETAILED DESCRIPTION OF PREFERRED EMBODIMENTS

Figure 1:
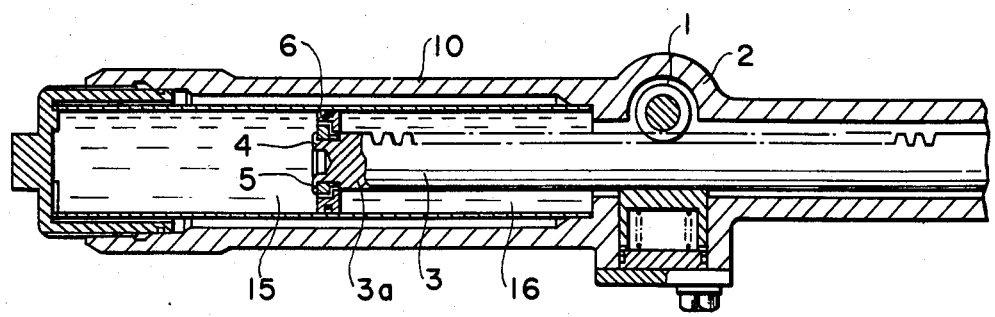
FIG. 1 is a longitudinal section of a conventional rack-and-pinion steering gear structure disclosed in U.S. Pat. No. 4,380,273 filed on Aug. 1, 1980.
Figure 2:
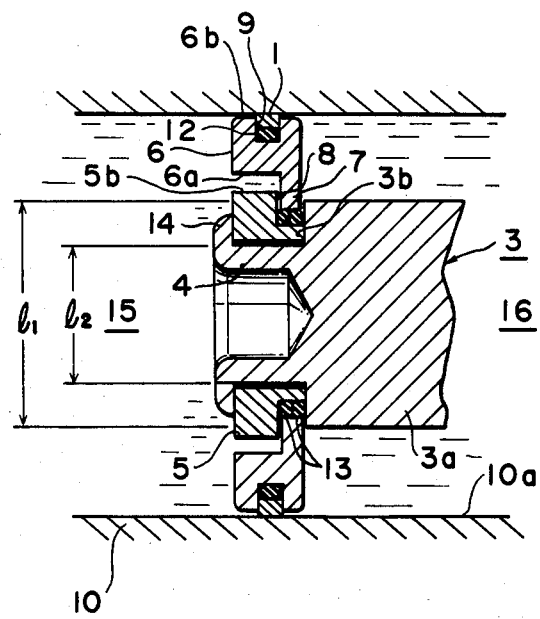
FIG. 2 is an enlargement of a crucial part of FIG. 1.
Figure 3:
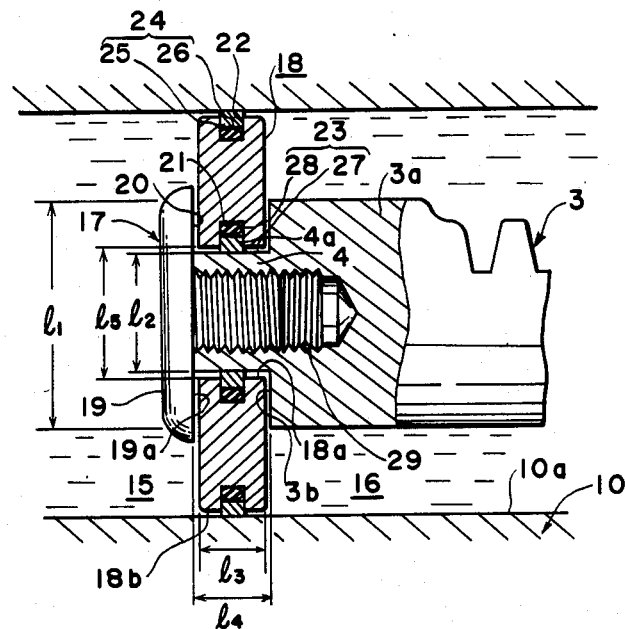
FIG. 3 is a cut-away view of a crucial part of the rack-and-pinion steering gear structure of a first preferred embodiment of the present invention.
Figure 5:
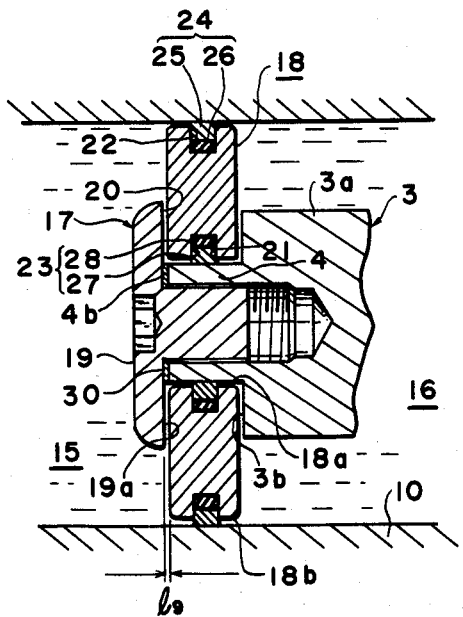
FIG. 5 is a longitudinal section of a rack-and-pinion steering gear structure of a second preferred embodiment.
Figure 4:
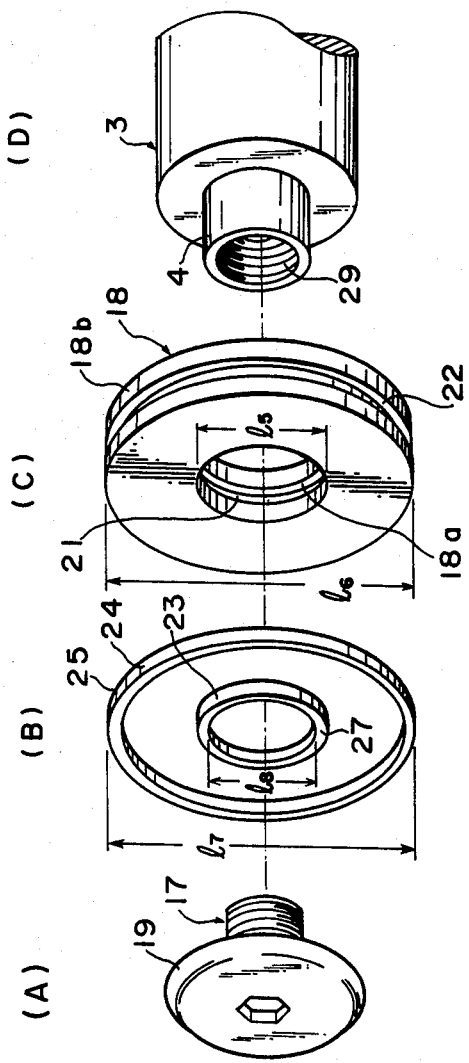

The reference numerals shown in FIGS. 3 and 4 are taken in part from FIGS. 1 and 2 and designate corresponding elements. Therefore, detailed description of these corresponding elements will be omitted here. Other elements of the steering gear not illustrated here are exemplified in U.S. Pat. No. 4,380,273 filed on Aug. 1, 1980, the contents of which are hereby incorporated by reference.

In FIGS. 3 and 4, numeral 17 denotes a bolt screwed axially into the boss 4 and having an outer diameter $l_2$ smaller than that of the rack 3. Numeral 18 denotes an annular piston received in an annular groove 20 defined by three surfaces, namely the base or seating surface of the bolt head 19, the end face 3b of the rack 3, and the outer periphery 4a of the boss 4. The piston 18 partitions the cylinder 10 into two chambers filled with a working medium, such as oil. the piston 18 has an axial width $l_3$ slightly smaller than that of the boss 4, i.e., the width $l_4$ of the annular groove 20. In addition, the inner diameter $l_5$ of the piston 18 is slightly larger than the outer diameter $l_2$ of the boss 4. Hence, the piston 18 is dimensioned so as to provide clearance in both the axial and radial directions with respect to the boss 4 (rack 3).

Numerals 21 and 22 denote annular inner and outer seal grooves respectively formed in the inner and outer peripheries 18a and 18b of piston 18. An elastic, annular seal member 23, 24 is inserted into each of the seal grooves 21, 22 respectively. Among these members, the outer seal member 24 has an outer diameter $l_7$ slightly larger than the outer diameter $l_6$ of the piston 18 and is in elastic contact with an inner periphery 10a of the cylinder 10 so as to provide a seal between the cylinder 10 and piston 18. The inner annular seal member 23 has an inner diameter $l_8$ slightly smaller than the inner diameter $l_5$ of the piston and is in elastic contact with the outer peripheral surface 4a of the boss 4 so as to provide a seal between the piston 18 and boss 4.

It should be noted that in this embodiment the outer annular seal member 24 comprises an outer seal ring 25 with high wear-resistance and a low coefficient of friction (such as the commercial material Teflon) and an elastic seal ring 26 encircled under tension by the ring 25 in order to increase the sealing effect due to the outer seal ring 25.

The process of mounting the piston onto the rack will be described hereinbelow.

First, the piston 18 with inner and outer annular seal members 23 and 24 installed within its inner and outer seal grooves 21 and 22 is mounted onto the boss 4.

Next, the bolt 17 is secured to the boss 4 by screwing it into a bolt hole 29 lying along the axis of the boss 4.

Thus, the piston 18 is elastically retained within the annular groove 20 defined by three surfaces, i.e., the seating surface 19a of the bolt head 19 of the bolt 17, the end face 3b of the rack 3, and the outer periphery 4a of the boss 4. the assembly operation of the piston 18 has been completed.

According to the rack-and-pinion steering gear structure described above, the assembly operation is very simple. In addition to the advantages of the quicker and easier assembly, the two operation chambers 15, 16 are reliably partitioned oil-tight by the annular seal member 23, 24 even when the piston 18, rack 3, and cylinder 10 are not coaxially installed or if the rack or part thereof is bent. Furthermore, no part of the outer periphery surface 18b of the piston 18 itself will come into contact with the inner periphery 10a of the cylinder 10.

A second preferred embodiment of the present invention will be described hereinbelow.

In this embodiment, an annular shim 30 is interposed between the seating surface 19a of the bolt head 19 of the bolt 17 and end face 4b of the boss 4. Adjustment of the thickness $l_9$ of the annular shim 30 allows the axial clearance within the groove 30 to be adjusted. Normally, the axial width $l_3$ of the piston 18 and the axial width $l_4$ of the annular groove 20 will be machined to within finite tolerances and a shim 30 of an appropriate thickness $l_9$ interposed between the seating surface 19a of the bolt head 19 and the end face of the boss 4 can easily correct any composite errors.

Figure 6:
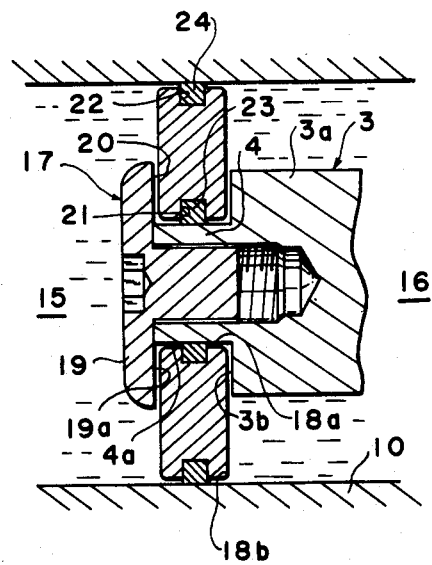
FIG. 6 is a longitudinal section of a rack-and-pinion steering gear structure of a third preferred embodiment.

A third preferred embodiment according to the present invention will be described hereinbelow with reference to FIG. 6.

The annular seal members 23, 24 are each single units instead of the separate inner and outer seal rings used in the first preferred embodiment shown in FIG. 3.

Since the elastic seal ring can be omitted if constructed in this way, a reduction in the number of parts and in the overall cost can be achieved.

It should be noted that since in all of the preferred embodiments, an inner annular seal member will be retained between the inner periphery 18a of the piston 18 and the outer periphery 4a of the boss 4, it is not always necessary to machine a seal groove 21 to retain inner annular seal member. In addition, a plurality of inner annular seal members may alternatively be used.

As apparent from the foregoing description, the piston can be elastically mounted with suitable axial clearance simply by sliding the piston having seal grooves retaining annular seals onto the boss and screwing a bolt into the boss, which greatly simplifies and expedites assembly. In addition, since the piston and seal grooves are not of complicated configuration, fabrication is easy and therefore the overall production cost is minimized. Consequently, the illustrated rack-and-pinion steering gear can be easily adapted to mass production.

It will be fully understood by those skilled in the art that the foregoing description is made in terms of preferred embodiments and various changes may be made without departing from the spirit and scope of the present invention, which is to be defined by the appended claims.

What is claimed is:

1. A steering gear structure for a vehicle, comprising:
  (a) a rack assembly housed in an oil-filled cylinder, driven by means of a pinion shaft linked to a steering wheel of the vehicle, said rack assembly having a boss portion which has an outer diamter smaller than the outer diameter of the remaining part thereof and projecting axially from one end of the rack assembly;
  (b) a substantially annular piston having an inner periphery which is of slightly larger diameter than and directly opposes an outer periphery of said boss portion, and an outer periphery of said annular piston being of slightly smaller diameter than and directly opposing an inner periphery of said oil-filled cylinder, which is floatingly supported on said boss portion and cylinder; and (c) a bolt having a threaded portion being inserted into a threaded portion of said boss portion and a head being of larger diameter than said boss portion for axially supporting said annular piston with a clearance against a surface of said boss portion and against a wall of the end of said rack assembly.

2. The steering gear structure as set forth in claim 1, wherein said annular seal member comprises an inner seal ring in contact with the outer peripheral surface of said boss and elastic seal ring encircled by said inner seal ring.

3. The steering gear structure as set forth in claim 1, wherein said annular seal member comprises a single substantially annular seal ring.

4. The steering gear structure as set forth in claim 1, further comprising an elastic and substantially annular seal member interposed between the inner periphery of said piston and the outer periphery surface of said boss portion and a substantially annular seal groove provided at the inner periphery of said piston for receiving said seal member therein.

5. The steering gear structure as set forth in claim 4, wherein said annular seal member comprises an inner seal ring in contact with the outer peripheral surface of said boss and elastic seal ring encircled by said inner seal ring.

6. The steering gear structure as set forth in claim 4, wherein said annular seal member comprises a single substantially annular seal ring.

7. The steering gear structure as set forth in claim 1, wherein said boss portion has a female threaded hole for receiving said threaded portion of said bolt.

8. The steering gear structure as set forth in claim 7, wherein said female threaded hole has an axis lying along the axes of said boss portions.

9. The steering gear structure as set forth in claim 1, wherein said boss portion has a female threaded hole for receiving said threaded portion.

10. The steering gear structure as set forth in claim 9, wherein said female threaded hole has an axis lying along the axis of said boss portion.

11. A steering gear structure for a vehicle, comprising
(a) a rack assembly housed in an oil-filled cylinder, driven by means of a pinion shaft linked to a steering wheel of the vehicle, said rack assembly having a boss portion which has an outer diamter smaller than the outer diameter of the remaining part thereof and projecting axially from one end of the rack assembly;

(b) a substantially annular portion having an inner periphery which is of slightly larger diameter than and directly opposes an outer periphery of said boss portion, and an outer periphery of said annular piston being of slightly smaller diameter than and directly opposing an inner periphery of said oil-filled cylinder, which is floatingly supported on said boss portion and cylinder; and (c) a bolt having a threaded portion being inserted into a threaded portion of said boss portion with said annular piston floatingly supported of said boss portion and cylinder and a head being of larger diameter than said boss portion for axially supporting said annular piston with a clearance against a surface of said boss portion and against a wall of the end of said rack assembly, the bolt head, surface of said boss portion, and end wall of said rack assembly defining a groove for receiving the piston.

12. The steering gear structure as set forth in claim 11, wherein the inner periphery of said substantially annular piston has an inner seal groove to retain an inner seal member therein between the inner periphery of said piston and the outer periphery of said boss portion whereby to permit elastic mounting by sliding said piston onto said boss portion and screwing the threaded portion of said bolt into said boss portion.

* * * * *